(12) United States Patent (10) Patent No.: US 8,496,828 B2
Johnson et al. (45) Date of Patent: *Jul. 30, 2013

(54) CLEANING IN MEMBRANE FILTRATION SYSTEMS

(75) Inventors: Warren Thomas Johnson, New South Wales (AU); Thomas William Beck, New South Wales (AU); Rebecca Yeo, Beijing (CN)

(73) Assignee: Siemens Industry, Inc., Alpharetta, GA (US)

( * ) Notice: Subject to any disclaimer, the term of this patent is extended or adjusted under 35 U.S.C. 154(b) by 305 days.

This patent is subject to a terminal disclaimer.

(21) Appl. No.: 11/722,411

(22) PCT Filed: Dec. 19, 2005

(86) PCT No.: PCT/US2005/001919
§ 371 (c)(1),
(2), (4) Date: Jun. 21, 2007

(87) PCT Pub. No.: WO2006/066319
PCT Pub. Date: Jun. 29, 2006

(65) Prior Publication Data
US 2008/0203016 A1 Aug. 28, 2008
US 2011/0114557 A2 May 19, 2011

(30) Foreign Application Priority Data

Dec. 24, 2004 (AU) ................. 2004907391

(51) Int. Cl.
*B01D 65/02* (2006.01)
*C02F 1/44* (2006.01)

(52) U.S. Cl.
USPC .................... 210/636; 210/500.23

(58) Field of Classification Search
USPC ........................................ 210/636
See application file for complete search history.

(56) References Cited

U.S. PATENT DOCUMENTS

| 256,008 A | 4/1882 | Leak |
| 285,321 A | 9/1883 | Tams |

(Continued)

FOREIGN PATENT DOCUMENTS

| AU | 34400/84 A | 4/1985 |
| AU | 55847/86 A | 9/1986 |

(Continued)

OTHER PUBLICATIONS

Supplementary European Search Report dated Apr. 7, 2009 for Application No. EP 05 81 8584.

(Continued)

*Primary Examiner* — Katherine Zalasky

(57) ABSTRACT

A method of cleaning permeable, hollow membranes is disclosed. In one embodiment, the membranes are immersed in a liquid suspension. A pressure differential is applied across the walls of the membranes. During filtration, liquid suspension passes through the walls of the membranes to be drawn off as permeate, and at least some solids are retained on or in the membranes. The steps of cleaning include: applying a cleaning solution to one side of the membrane walls; applying a pressure differential across the membrane walls to cause flow of the cleaning solution through the walls from the one side of the membrane walls to the other side of the membrane walls; and, applying a reverse pressure differential across the membrane walls to cause flow of the cleaning solution through the wall from the other side of the membrane walls back to the one side of the membrane walls.

20 Claims, 4 Drawing Sheets

U.S. PATENT DOCUMENTS

| | | |
|---|---|---|
| 511,995 A | 1/1894 | Buckley |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A * | 8/1988 | Ford .................. 210/636 |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |

| | | | | | |
|---|---|---|---|---|---|
| 4,904,426 A | 2/1990 | Lundgard et al. | 5,364,529 A | 11/1994 | Morin et al. |
| 4,908,114 A | 3/1990 | Ayers | 5,374,353 A | 12/1994 | Murphy |
| 4,919,815 A | 4/1990 | Copa et al. | 5,389,260 A | 2/1995 | Hemp et al. |
| 4,921,610 A * | 5/1990 | Ford et al. ............... 210/636 | 5,393,433 A | 2/1995 | Espenan et al. |
| 4,931,186 A * | 6/1990 | Ford et al. ............... 210/636 | 5,396,019 A | 3/1995 | Sartori et al. |
| 4,933,084 A | 6/1990 | Bandel et al. | 5,401,401 A | 3/1995 | Hickok et al. |
| 4,935,143 A | 6/1990 | Kopp et al. | 5,401,405 A | 3/1995 | McDougald |
| 4,952,317 A | 8/1990 | Culkin | 5,403,479 A | 4/1995 | Smith et al. |
| 4,963,304 A | 10/1990 | Im et al. | 5,405,528 A | 4/1995 | Selbie et al. |
| 4,966,699 A | 10/1990 | Sasaki et al. | 5,411,663 A | 5/1995 | Johnson |
| 4,968,430 A | 11/1990 | Hildenbrand et al. | 5,417,101 A | 5/1995 | Weich |
| 4,968,733 A | 11/1990 | Muller et al. | 5,419,816 A | 5/1995 | Sampson et al. |
| 4,969,997 A | 11/1990 | Kluver et al. | 5,425,415 A | 6/1995 | Master et al. |
| 4,988,444 A | 1/1991 | Applegate et al. | 5,451,317 A | 9/1995 | Ishida et al. |
| 4,999,038 A | 3/1991 | Lundberg | 5,458,779 A | 10/1995 | Odegaard |
| 5,002,666 A | 3/1991 | Matsumoto et al. | 5,468,397 A | 11/1995 | Barboza et al. |
| 5,005,430 A | 4/1991 | Kibler et al. | 5,470,469 A | 11/1995 | Eckman |
| 5,015,275 A | 5/1991 | Beck et al. | 5,477,731 A | 12/1995 | Mouton |
| 5,024,762 A * | 6/1991 | Ford et al. ............... 210/321.69 | 5,479,590 A | 12/1995 | Lin |
| 5,034,125 A | 7/1991 | Karbachsch et al. | 5,480,553 A | 1/1996 | Yamamori et al. |
| 5,043,113 A | 8/1991 | Kafchinski et al. | 5,482,625 A | 1/1996 | Shimizu et al. |
| 5,059,317 A | 10/1991 | Marius et al. | 5,484,528 A | 1/1996 | Yagi et al. |
| 5,066,375 A | 11/1991 | Parsi et al. | 5,490,939 A | 2/1996 | Gerigk et al. |
| 5,066,401 A | 11/1991 | Muller et al. | 5,491,023 A | 2/1996 | Tsai et al. |
| 5,066,402 A | 11/1991 | Anselme et al. | 5,501,798 A | 3/1996 | Al-Samadi et al. |
| 5,069,065 A | 12/1991 | Sprunt et al. | 5,525,220 A | 6/1996 | Yagi et al. |
| 5,069,353 A | 12/1991 | Espenan | 5,531,848 A | 7/1996 | Brinda et al. |
| 5,075,044 A | 12/1991 | Augem | 5,531,900 A | 7/1996 | Raghavan et al. |
| 5,075,065 A | 12/1991 | Effenberger et al. | 5,543,002 A | 8/1996 | Brinda et al. |
| 5,076,925 A | 12/1991 | Roesink et al. | 5,552,047 A | 9/1996 | Oshida et al. |
| 5,079,272 A | 1/1992 | Allegrezza, Jr. et al. | 5,554,283 A | 9/1996 | Brinda et al. |
| 5,080,770 A | 1/1992 | Culkin | 5,556,591 A | 9/1996 | Jallerat et al. |
| 5,094,750 A | 3/1992 | Kopp et al. | 5,575,963 A | 11/1996 | Soffer et al. |
| 5,094,867 A | 3/1992 | Detering et al. | 5,597,732 A | 1/1997 | Bryan-Brown |
| 5,098,567 A | 3/1992 | Nishiguchi | 5,607,593 A | 3/1997 | Cote et al. |
| 5,102,550 A | 4/1992 | Pizzino et al. | 5,626,755 A | 5/1997 | Keyser et al. |
| 5,104,535 A | 4/1992 | Cote et al. | 5,629,084 A | 5/1997 | Moya |
| 5,104,546 A | 4/1992 | Filson et al. | 5,633,163 A | 5/1997 | Cameron |
| H1045 H | 5/1992 | Wilson | 5,639,373 A | 6/1997 | Mahendran et al. |
| 5,135,663 A | 8/1992 | Newberth, III et al. | 5,643,455 A * | 7/1997 | Kopp et al. ............... 210/636 |
| 5,137,631 A | 8/1992 | Eckman et al. | 5,647,988 A | 7/1997 | Kawanishi et al. |
| 5,138,870 A | 8/1992 | Lyssy | 5,670,053 A | 9/1997 | Collentro et al. |
| 5,147,553 A | 9/1992 | Waite | 5,677,360 A | 10/1997 | Yamamori et al. |
| 5,151,191 A | 9/1992 | Sunaoka et al. | 5,688,460 A | 11/1997 | Ruschke |
| 5,151,193 A | 9/1992 | Grobe et al. | 5,690,830 A | 11/1997 | Ohtani et al. |
| 5,156,738 A | 10/1992 | Maxson | 5,733,456 A | 3/1998 | Okey et al. |
| 5,158,721 A | 10/1992 | Allegrezza, Jr. et al. | 5,744,037 A | 4/1998 | Fujimura et al. |
| 5,169,528 A | 12/1992 | Karbachsch et al. | 5,747,605 A | 5/1998 | Breant et al. |
| 5,169,530 A | 12/1992 | Schucker et al. | 5,766,479 A | 6/1998 | Collentro et al. |
| 5,180,407 A | 1/1993 | DeMarco | D396,046 S | 7/1998 | Scheel et al. |
| 5,182,019 A | 1/1993 | Cote et al. | 5,783,083 A | 7/1998 | Henshaw et al. |
| 5,186,821 A | 2/1993 | Murphy | D396,726 S | 8/1998 | Sadr et al. |
| 5,192,442 A | 3/1993 | Piccirillo et al. | 5,814,234 A | 9/1998 | Bower et al. |
| 5,192,456 A | 3/1993 | Ishida et al. | D400,890 S | 11/1998 | Gambardella |
| 5,192,478 A | 3/1993 | Caskey | 5,843,069 A | 12/1998 | Butler et al. |
| 5,194,149 A | 3/1993 | Selbie et al. | 5,846,424 A | 12/1998 | Khudenko |
| 5,198,116 A | 3/1993 | Comstock et al. | 5,846,425 A | 12/1998 | Whiteman |
| 5,198,162 A | 3/1993 | Park et al. | 5,871,823 A | 2/1999 | Anders et al. |
| 5,203,405 A | 4/1993 | Gentry et al. | 5,888,401 A | 3/1999 | Nguyen |
| 5,209,852 A | 5/1993 | Sunaoka et al. | 5,895,521 A | 4/1999 | Otsuka et al. |
| 5,211,823 A | 5/1993 | Giuffrida et al. | 5,895,570 A | 4/1999 | Liang |
| 5,221,478 A | 6/1993 | Dhingra et al. | 5,906,739 A | 5/1999 | Osterland et al. |
| 5,227,063 A | 7/1993 | Langerak et al. | 5,906,742 A | 5/1999 | Wang et al. |
| 5,248,424 A | 9/1993 | Cote et al. | 5,910,250 A | 6/1999 | Mahendran et al. |
| 5,262,054 A | 11/1993 | Wheeler | 5,914,039 A | 6/1999 | Mahendran et al. |
| 5,269,919 A | 12/1993 | von Medlin | 5,918,264 A | 6/1999 | Drummond et al. |
| 5,271,830 A | 12/1993 | Faivre et al. | 5,942,113 A | 8/1999 | Morimura |
| 5,275,766 A | 1/1994 | Gadkaree et al. | 5,944,997 A | 8/1999 | Pedersen et al. |
| 5,286,324 A | 2/1994 | Kawai et al. | 5,951,878 A | 9/1999 | Astrom |
| 5,290,451 A | 3/1994 | Koster et al. | 5,958,243 A | 9/1999 | Lawrence et al. |
| 5,290,457 A | 3/1994 | Karbachsch et al. | 5,961,830 A | 10/1999 | Barnett |
| 5,297,420 A | 3/1994 | Gilliland et al. | 5,968,357 A | 10/1999 | Doelle et al. |
| 5,316,671 A | 5/1994 | Murphy | 5,988,400 A | 11/1999 | Karachevtcev et al. |
| 5,320,760 A | 6/1994 | Freund et al. | 5,989,428 A | 11/1999 | Goronszy |
| 5,353,630 A | 10/1994 | Soda et al. | 5,997,745 A | 12/1999 | Tonelli et al. |
| 5,354,470 A | 10/1994 | Seita et al. | 6,001,254 A | 12/1999 | Espenan et al. |
| 5,358,732 A | 10/1994 | Seifter et al. | 6,007,712 A | 12/1999 | Tanaka et al. |
| 5,361,625 A | 11/1994 | Ylvisaker | 6,017,451 A | 1/2000 | Kopf |
| 5,364,527 A | 11/1994 | Zimmermann et al. | 6,024,872 A | 2/2000 | Mahendran et al. |

| | | | | | | |
|---|---|---|---|---|---|---|
| 6,036,030 | A | 3/2000 | Stone et al. | 6,635,179 B1 | 10/2003 | Summerton et al. |
| 6,039,872 | A | 3/2000 | Wu et al. | 6,641,733 B2 | 11/2003 | Zha et al. |
| 6,042,677 | A | 3/2000 | Mahendran et al. | 6,645,374 B2 | 11/2003 | Cote et al. |
| 6,045,698 | A | 4/2000 | Cote et al. ............ 210/636 | 6,656,356 B2 | 12/2003 | Gungerich et al. |
| 6,045,899 | A | 4/2000 | Wang et al. | 6,682,652 B2 | 1/2004 | Mahendran et al. |
| 6,048,454 | A | 4/2000 | Jenkins | 6,685,832 B2 | 2/2004 | Mahendran et al. |
| 6,048,455 | A | 4/2000 | Janik | 6,696,465 B2 | 2/2004 | Dellaria et al. |
| 6,066,401 | A | 5/2000 | Stilburn | 6,702,561 B2 | 3/2004 | Stillig et al. |
| 6,071,404 | A | 6/2000 | Tsui | 6,706,185 B2 | 3/2004 | Goel et al. |
| 6,074,718 | A | 6/2000 | Puglia et al. | 6,706,189 B2 | 3/2004 | Rabie et al. |
| 6,077,435 | A | 6/2000 | Beck et al. | 6,708,957 B2 | 3/2004 | Cote et al. |
| 6,083,393 | A | 7/2000 | Wu et al. | 6,712,970 B1 | 3/2004 | Trivedi |
| 6,096,213 | A | 8/2000 | Radovanovic et al. | 6,721,529 B2 | 4/2004 | Chen et al. |
| 6,113,782 | A | 9/2000 | Leonard | 6,723,242 B1 | 4/2004 | Ohkata et al. |
| 6,120,688 | A | 9/2000 | Daly et al. | 6,723,758 B2 | 4/2004 | Stone et al. |
| 6,126,819 | A | 10/2000 | Heine et al. | 6,727,305 B1 | 4/2004 | Pavez Aranguiz |
| 6,146,747 | A | 11/2000 | Wang et al. | 6,743,362 B1 | 6/2004 | Porteous et al. |
| 6,149,817 | A | 11/2000 | Peterson et al. | 6,755,970 B1 | 6/2004 | Knappe et al. |
| 6,156,200 | A | 12/2000 | Zha et al. | 6,758,972 B2 | 7/2004 | Vriens et al. |
| 6,159,373 | A | 12/2000 | Beck et al. | 6,761,826 B2 | 7/2004 | Bender |
| 6,193,890 | B1 | 2/2001 | Pedersen et al. | 6,770,202 B1 | 8/2004 | Kidd et al. |
| 6,202,475 | B1 | 3/2001 | Selbie et al. | 6,780,466 B2 | 8/2004 | Grangeon et al. |
| 6,214,231 | B1 | 4/2001 | Cote et al. | 6,783,008 B2 | 8/2004 | Zha et al. |
| 6,214,232 | B1 | 4/2001 | Baurmeister et al. | 6,790,347 B2 | 9/2004 | Jeong et al. |
| 6,221,247 | B1 | 4/2001 | Nemser et al. | 6,790,912 B2 | 9/2004 | Blong |
| 6,245,239 | B1 | 6/2001 | Cote et al. | 6,805,806 B2 | 10/2004 | Arnaud |
| 6,254,773 | B1 | 7/2001 | Biltoft | 6,808,629 B2 | 10/2004 | Wouters-Wasiak et al. |
| 6,264,839 | B1 | 7/2001 | Mohr et al. | 6,811,696 B2 | 11/2004 | Wang et al. |
| 6,277,512 | B1 | 8/2001 | Hamrock et al. | 6,814,861 B2 | 11/2004 | Husain et al. |
| 6,280,626 | B1 | 8/2001 | Miyashita et al. | 6,821,420 B2 | 11/2004 | Zha et al. |
| 6,284,135 | B1 | 9/2001 | Ookata | 6,830,782 B2 | 12/2004 | Kanazawa |
| 6,290,756 | B1 | 9/2001 | Macheras et al. | 6,841,070 B2 | 1/2005 | Zha et al. |
| 6,294,039 | B1 | 9/2001 | Mahendran et al. | 6,861,466 B2 | 3/2005 | Dadalas et al. |
| 6,299,773 | B1 | 10/2001 | Takamura et al. | 6,863,816 B2 | 3/2005 | Austin et al. |
| 6,303,026 | B1 | 10/2001 | Lindbo | 6,863,817 B2 | 3/2005 | Liu et al. |
| 6,303,035 | B1 | 10/2001 | Cote et al. | 6,863,818 B2 | 3/2005 | Daigger et al. |
| 6,315,895 | B1 | 11/2001 | Summerton et al. | 6,863,823 B2 | 3/2005 | Cote |
| 6,319,411 | B1 | 11/2001 | Cote | 6,869,534 B2 | 3/2005 | McDowell et al. |
| 6,322,703 | B1 | 11/2001 | Taniguchi et al. | 6,872,305 B2 | 3/2005 | Johnson et al. |
| 6,324,898 | B1 | 12/2001 | Cote et al. | 6,881,343 B2 | 4/2005 | Rabie et al. |
| 6,325,928 | B1 | 12/2001 | Pedersen et al. | 6,884,350 B2 | 4/2005 | Muller |
| 6,325,938 | B1 | 12/2001 | Miyashita et al. | 6,884,375 B2 | 4/2005 | Wang et al. |
| 6,331,248 | B1 | 12/2001 | Taniguchi et al. | 6,890,435 B2 | 5/2005 | Ji et al. |
| 6,337,018 | B1 | 1/2002 | Mickols | 6,890,645 B2 | 5/2005 | Disse et al. |
| RE37,549 | E | 2/2002 | Mahendran et al. | 6,893,568 B1 | 5/2005 | Janson et al. |
| 6,349,835 | B1 | 2/2002 | Saux et al. | 6,899,812 B2 | 5/2005 | Cote et al. |
| 6,354,444 | B1 | 3/2002 | Mahendran et al. | 6,936,085 B2 | 8/2005 | DeMarco |
| 6,361,695 | B1 | 3/2002 | Husain et al. | 6,946,073 B2 | 9/2005 | Daigger et al. |
| 6,368,819 | B1 | 4/2002 | Gaddy et al. | 6,952,258 B2 | 10/2005 | Ebert et al. |
| 6,372,138 | B1 | 4/2002 | Cho et al. | 6,955,762 B2 | 10/2005 | Gallagher et al. |
| 6,375,848 | B1 | 4/2002 | Cote et al. | 6,962,258 B2 | 11/2005 | Zha et al. |
| 6,383,369 | B2 | 5/2002 | Elston | 6,964,741 B2 | 11/2005 | Mahendran et al. |
| 6,387,189 | B1 | 5/2002 | Groschl et al. | 6,969,465 B2 | 11/2005 | Zha et al. |
| 6,402,955 | B2 | 6/2002 | Ookata | 6,974,554 B2 | 12/2005 | Cox et al. |
| 6,406,629 | B1 | 6/2002 | Husain et al. | 6,994,867 B1 | 2/2006 | Hossainy et al. |
| 6,423,214 | B1 | 7/2002 | Lindbo | 7,005,100 B2 | 2/2006 | Lowell |
| 6,423,784 | B1 | 7/2002 | Hamrock et al. | 7,014,763 B2 | 3/2006 | Johnson et al. |
| 6,432,310 | B1 | 8/2002 | Andou et al. | 7,018,530 B2 | 3/2006 | Pollock |
| 6,440,303 | B2 | 8/2002 | Spriegel | 7,018,533 B2 | 3/2006 | Johnson et al. |
| D462,699 | S | 9/2002 | Johnson et al. | 7,022,233 B2 | 4/2006 | Chen |
| 6,444,124 | B1 | 9/2002 | Onyeche et al. | 7,041,728 B2 | 5/2006 | Zipplies et al. |
| 6,468,430 | B1 | 10/2002 | Kimura et al. | 7,052,610 B2 | 5/2006 | Janson et al. |
| 6,471,869 | B1 | 10/2002 | Yanou et al. | 7,083,733 B2 | 8/2006 | Freydina et al. |
| 6,485,645 | B1 | 11/2002 | Husain et al. | 7,087,173 B2 | 8/2006 | Cote et al. |
| 6,495,041 | B2 | 12/2002 | Taniguchi et al. | 7,122,121 B1 | 10/2006 | Ji |
| 6,517,723 | B1 | 2/2003 | Daigger et al. | 7,147,777 B1 | 12/2006 | Porteous |
| 6,524,481 | B2 | 2/2003 | Zha et al. | 7,147,778 B1 | 12/2006 | DiMassimo et al. |
| 6,524,733 | B1 | 2/2003 | Nonobe | 7,160,455 B2 | 1/2007 | Taniguchi et al. |
| 6,550,747 | B2 | 4/2003 | Rabie et al. | 7,160,463 B2 | 1/2007 | Beck et al. |
| 6,555,005 | B1 | 4/2003 | Zha et al. | 7,160,464 B2 | 1/2007 | Lee et al. |
| 6,562,237 | B1 | 5/2003 | Olaopa | 7,172,699 B1 | 2/2007 | Trivedi et al. |
| 6,576,136 | B1 | 6/2003 | De Moel et al. | 7,172,701 B2 | 2/2007 | Gaid et al. |
| 6,592,762 | B2 | 7/2003 | Smith | 7,186,344 B2 | 3/2007 | Hughes |
| D478,913 | S | 8/2003 | Johnson et al. | 7,208,091 B2 * | 4/2007 | Pind et al. ............ 210/645 |
| 6,613,222 | B2 | 9/2003 | Mikkelson et al. | 7,223,340 B2 | 5/2007 | Zha et al. |
| 6,620,319 | B2 | 9/2003 | Behmann et al. | 7,226,541 B2 | 6/2007 | Muller et al. |
| 6,623,643 | B2 | 9/2003 | Chisholm et al. | 7,247,238 B2 | 7/2007 | Mullette et al. |
| 6,627,082 | B2 | 9/2003 | Del Vecchio et al. | 7,264,716 B2 | 9/2007 | Johnson et al. |
| 6,632,358 | B1 | 10/2003 | Suga et al. | 7,279,100 B2 | 10/2007 | Devine |

| Patent/Pub No. | Date | Inventor |
|---|---|---|
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 * | 5/2008 | Bartels et al. ............... 210/636 |
| 7,387,723 B2 | 6/2008 | Jordan |
| 7,404,896 B2 | 7/2008 | Muller |
| 7,410,584 B2 | 8/2008 | Devine |
| 7,455,765 B2 | 11/2008 | Elefritz et al. |
| 7,481,933 B2 | 1/2009 | Barnes |
| 7,507,274 B2 | 3/2009 | Tonkovich et al. |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,648,634 B2 | 1/2010 | Probst |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |
| 2002/0070157 A1 | 6/2002 | Yamada |
| 2002/0117444 A1 | 8/2002 | Mikkelson et al. |
| 2002/0148767 A1 | 10/2002 | Johnson et al. |
| 2002/0153313 A1 | 10/2002 | Cote |
| 2002/0185435 A1 | 12/2002 | Husain et al. |
| 2002/0189999 A1 | 12/2002 | Espenan et al. |
| 2002/0195390 A1 | 12/2002 | Zha et al. |
| 2003/0038080 A1 | 2/2003 | Vriens et al. |
| 2003/0042199 A1 | 3/2003 | Smith |
| 2003/0052055 A1 | 3/2003 | Akamatsu et al. |
| 2003/0056919 A1 | 3/2003 | Beck |
| 2003/0057155 A1 | 3/2003 | Husain et al. |
| 2003/0075495 A1 | 4/2003 | Dannstrom et al. |
| 2003/0121855 A1 | 7/2003 | Kopp |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0159988 A1 | 8/2003 | Daigger et al. |
| 2003/0178365 A1 | 9/2003 | Zha et al. |
| 2003/0196955 A1 | 10/2003 | Hughes |
| 2003/0226797 A1 | 12/2003 | Phelps |
| 2003/0234221 A1 | 12/2003 | Johnson et al. |
| 2004/0007523 A1 | 1/2004 | Gabon et al. |
| 2004/0007525 A1 | 1/2004 | Rabie et al. |
| 2004/0035770 A1 | 2/2004 | Edwards et al. |
| 2004/0045893 A1 | 3/2004 | Watanabe et al. |
| 2004/0050791 A1 | 3/2004 | Herczeg |
| 2004/0055974 A1 | 3/2004 | Del Vecchio et al. |
| 2004/0084369 A1 | 5/2004 | Zha et al. |
| 2004/0108268 A1 | 6/2004 | Liu et al. |
| 2004/0112831 A1 | 6/2004 | Rabie et al. |
| 2004/0139992 A1 | 7/2004 | Murkute et al. |
| 2004/0145076 A1 | 7/2004 | Zha et al. |
| 2004/0149655 A1 | 8/2004 | Petrucco et al. |
| 2004/0154671 A1 | 8/2004 | Martins et al. |
| 2004/0168978 A1 | 9/2004 | Gray |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0188341 A1 | 9/2004 | Zha et al. |
| 2004/0211726 A1 | 10/2004 | Baig et al. |
| 2004/0217053 A1 | 11/2004 | Zha et al. |
| 2004/0222158 A1 | 11/2004 | Husain et al. |
| 2004/0232076 A1 | 11/2004 | Zha et al. |
| 2004/0238442 A1 | 12/2004 | Johnson et al. |
| 2004/0245174 A1 | 12/2004 | Takayama et al. |
| 2005/0006308 A1 | 1/2005 | Cote et al. |
| 2005/0023219 A1 | 2/2005 | Kirker et al. |
| 2005/0029185 A1 | 2/2005 | Muller |
| 2005/0029186 A1 | 2/2005 | Muller |
| 2005/0032982 A1 | 2/2005 | Muller |
| 2005/0045557 A1 | 3/2005 | Daigger et al. |
| 2005/0053878 A1 | 3/2005 | Bruun et al. |
| 2005/0061725 A1 | 3/2005 | Liu et al. |
| 2005/0077227 A1 | 4/2005 | Kirker et al. |
| 2005/0098494 A1 | 5/2005 | Mullette et al. |
| 2005/0103722 A1 | 5/2005 | Freydina et al. |
| 2005/0109692 A1 | 5/2005 | Zha et al. |
| 2005/0115880 A1 | 6/2005 | Pollock |
| 2005/0115899 A1 | 6/2005 | Liu et al. |
| 2005/0121389 A1 | 6/2005 | Janson et al. |
| 2005/0126963 A1 | 6/2005 | Phagoo et al. |
| 2005/0139538 A1 | 6/2005 | Lazaredes |
| 2005/0184008 A1 | 8/2005 | Schacht et al. |
| 2005/0194310 A1 | 9/2005 | Yamamoto et al. |
| 2005/0194315 A1 | 9/2005 | Adams et al. |
| 2005/0258098 A1 | 11/2005 | Vincent et al. |
| 2006/0000775 A1 | 1/2006 | Zha et al. |
| 2006/0021929 A1 | 2/2006 | Mannheim et al. |
| 2006/0065596 A1 | 3/2006 | Kent et al. |
| 2006/0081533 A1 | 4/2006 | Khudenko |
| 2006/0131234 A1 | 6/2006 | Zha et al. |
| 2006/0201876 A1 | 9/2006 | Jordan |
| 2006/0201879 A1 | 9/2006 | Den Boestert et al. |
| 2006/0249448 A1 | 11/2006 | Fujishima et al. |
| 2006/0249449 A1 | 11/2006 | Nakhla et al. |
| 2006/0261007 A1 | 11/2006 | Zha et al. |
| 2006/0273007 A1 | 12/2006 | Zha et al. |
| 2006/0273038 A1 | 12/2006 | Syed et al. |
| 2007/0007205 A1 | 1/2007 | Johnson et al. |
| 2007/0007214 A1 | 1/2007 | Zha et al. |
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0056522 A1 | 3/2011 | Zauner et al. |
| 2011/0100907 A1 | 5/2011 | Zha et al. |
| 2011/0127209 A1 | 6/2011 | Rogers et al. |
| 2011/0132826 A1 | 6/2011 | Muller et al. |
| 2011/0139715 A1 | 6/2011 | Zha et al. |

| | | | | | | | |
|---|---|---|---|---|---|---|---|
| 2011/0192783 | A1 | 8/2011 | Cox et al. | JP | 53108882 | A | 9/1978 |
| 2011/0198283 | A1 | 8/2011 | Zha et al. | JP | 54162684 | A | 12/1979 |
| 2012/0091602 | A1 | 4/2012 | Cumin et al. | JP | 55099703 | A | 7/1980 |
| | | | | JP | 55129107 | A | 10/1980 |

FOREIGN PATENT DOCUMENTS

| | | | | | | |
|---|---|---|---|---|---|---|
| AU | 77066/87 | A | 2/1988 | JP | 55129155 A | 10/1980 |
| AU | 762091 | B2 | 6/2003 | JP | 56021604 A | 2/1981 |
| AU | 2004289373 | A1 | 5/2005 | JP | 56118701 A | 9/1981 |
| CA | 2460207 | | 3/2003 | JP | 56121685 A | 9/1981 |
| CA | 2531764 | A1 | 3/2005 | JP | 57190697 A | 11/1982 |
| CN | 86104888 | A | 2/1988 | JP | 58088007 A | 5/1983 |
| CN | 1050770 | | 1/1995 | JP | 60019002 A | 1/1985 |
| CN | 2204898 | Y | 8/1995 | JP | 60-206412 | 10/1985 |
| CN | 2236049 | Y | 9/1996 | JP | 60260628 A | 12/1985 |
| CN | 1159769 | A | 9/1997 | JP | 61097005 A | 5/1986 |
| CN | 1244814 | A | 2/2000 | JP | 61097006 A | 5/1986 |
| CN | 1249698 | A | 4/2000 | JP | 61107905 A | 5/1986 |
| CN | 1265636 | A | 9/2000 | JP | 61167406 A | 7/1986 |
| CN | 1319032 | A | 10/2001 | JP | 61167407 A | 7/1986 |
| CN | 1541757 | A | 11/2004 | JP | 61171504 A | 8/1986 |
| DE | 3904544 | A1 | 8/1990 | JP | 61192309 A | 8/1986 |
| DE | 4117281 | A1 | 1/1992 | JP | 61222510 A | 10/1986 |
| DE | 4113420 | A1 | 10/1992 | JP | 61242607 A | 10/1986 |
| DE | 4117422 | C1 | 11/1992 | JP | 61249505 A | 11/1986 |
| DE | 4326603 | A1 | 2/1995 | JP | 61257203 A | 11/1986 |
| DE | 19503060 | A1 | 8/1996 | JP | 61263605 A | 11/1986 |
| DE | 29804927 | U1 | 6/1998 | JP | 61291007 A | 12/1986 |
| DE | 29906389 | U1 | 6/1999 | JP | 61293504 A | 12/1986 |
| DE | 10045227 | C1 | 2/2002 | JP | 62004408 A | 1/1987 |
| DE | 10209170 | C1 | 8/2003 | JP | 62068828 A | 3/1987 |
| DE | 202004012693 | U1 | 10/2004 | JP | 62114609 A | 5/1987 |
| EP | 012557 | B1 | 2/1983 | JP | 62140607 A | 6/1987 |
| EP | 126714 | A2 | 11/1984 | JP | 62144708 A | 6/1987 |
| EP | 050447 | B1 | 10/1985 | JP | 62163708 A | 7/1987 |
| EP | 194735 | A2 | 9/1986 | JP | 62179540 A | 8/1987 |
| EP | 250337 | A1 | 12/1987 | JP | 62237908 A | 10/1987 |
| EP | 327025 | A1 | 8/1989 | JP | 62250908 A | 10/1987 |
| EP | 344633 | A1 | 12/1989 | JP | 62187606 | 11/1987 |
| EP | 090383 | B1 | 5/1990 | JP | 62262710 A | 11/1987 |
| EP | 407900 | A2 | 1/1991 | JP | 63-93307 | 4/1988 |
| EP | 463627 | A2 | 1/1992 | JP | 63097634 A | 4/1988 |
| EP | 0464321 | A1 | 1/1992 | JP | 63099246 A | 4/1988 |
| EP | 492942 | A2 | 7/1992 | JP | 63143905 A | 6/1988 |
| EP | 518250 | B1 | 12/1992 | JP | 63-1602 | 7/1988 |
| EP | 547575 | A1 | 6/1993 | JP | 63171607 A | 7/1988 |
| EP | 280052 | B1 | 7/1994 | JP | 63180254 A | 7/1988 |
| EP | 395133 | B1 | 2/1995 | JP | S63-38884 | 10/1988 |
| EP | 662341 | A1 | 7/1995 | JP | 64-075542 A | 3/1989 |
| EP | 492446 | B1 | 11/1995 | JP | 1-501046 T | 4/1989 |
| EP | 430082 | B1 | 6/1996 | JP | 1111494 | 4/1989 |
| EP | 734758 | A1 | 10/1996 | JP | 01151906 A | 6/1989 |
| EP | 763758 | A1 | 3/1997 | JP | 01-307409 A | 12/1989 |
| EP | 824956 | A2 | 2/1998 | JP | 02-017925 | 1/1990 |
| EP | 848194 | A2 | 6/1998 | JP | 02017924 | 1/1990 |
| EP | 855214 | A1 | 7/1998 | JP | 02026625 A | 1/1990 |
| EP | 627255 | B1 | 1/1999 | JP | 02031200 A | 2/1990 |
| EP | 911073 | A1 | 4/1999 | JP | 02040296 A | 2/1990 |
| EP | 920904 | A2 | 6/1999 | JP | 02107318 A | 4/1990 |
| EP | 0937494 | A2 | 8/1999 | JP | 02126922 A | 5/1990 |
| EP | 1034835 | A1 | 9/2000 | JP | 02144132 A | 6/1990 |
| EP | 1052012 | A1 | 11/2000 | JP | 02164423 A | 6/1990 |
| EP | 1156015 | A1 | 11/2001 | JP | 02174918 A | 7/1990 |
| EP | 1300186 | A1 | 4/2003 | JP | 02241523 A | 9/1990 |
| EP | 1349644 | B1 | 10/2003 | JP | 02277528 A | 11/1990 |
| EP | 1350555 | A1 | 10/2003 | JP | 02284035 A | 11/1990 |
| EP | 1236503 | B1 | 8/2004 | JP | 03018373 A | 1/1991 |
| EP | 1445240 | | 8/2004 | JP | 03028797 A | 2/1991 |
| EP | 1466658 | A1 | 10/2004 | JP | 03-086529 A | 4/1991 |
| EP | 1659171 | A1 | 5/2006 | JP | 03110445 A | 5/1991 |
| EP | 1420874 | B1 | 1/2011 | JP | 04108518 A | 4/1992 |
| FR | 2620712 | A1 | 3/1989 | JP | 04110023 A | 4/1992 |
| FR | 2674448 | A1 | 10/1992 | JP | 4-190889 A | 7/1992 |
| FR | 2699424 | A1 | 6/1994 | JP | 04187224 A | 7/1992 |
| FR | 2762834 | A1 | 11/1998 | JP | 4-256425 A | 9/1992 |
| GB | 702911 | A | 1/1954 | JP | 04250898 A | 9/1992 |
| GB | 996195 | A | 6/1965 | JP | 04256424 A | 9/1992 |
| GB | 2253572 | A | 9/1992 | JP | 04265128 A | 9/1992 |
| JP | 52-078677 | A | 7/1977 | JP | 04293527 A | 10/1992 |
| JP | 53-5077 | | 1/1978 | JP | 04310223 A | 11/1992 |
| | | | | JP | 04317793 A | 11/1992 |

| | | | | | | |
|---|---|---|---|---|---|---|
| JP | 04334530 | A | 11/1992 | JP | 10249171 A | 9/1998 |
| JP | 04348252 | A | 12/1992 | JP | 10286441 A | 10/1998 |
| JP | 05023557 | A | 2/1993 | JP | 10328538 A | 12/1998 |
| JP | 05096136 | A | 4/1993 | JP | 11005023 A | 1/1999 |
| JP | 05137977 | A | 6/1993 | JP | 11028467 A | 2/1999 |
| JP | 05157654 | A | 6/1993 | JP | 11031025 A | 2/1999 |
| JP | 05161831 | A | 6/1993 | JP | 11033365 A | 2/1999 |
| JP | 05184884 | A | 7/1993 | JP | 11033367 A | 2/1999 |
| JP | 05279447 | A | 10/1993 | JP | 11 076769 A | 3/1999 |
| JP | 05285348 | A | 11/1993 | JP | 11076770 A | 3/1999 |
| JP | 05305221 | A | 11/1993 | JP | 11156166 A | 6/1999 |
| JP | 06-027215 | A | 2/1994 | JP | 11156360 A | 6/1999 |
| JP | 06071120 | A | 3/1994 | JP | 11165200 A | 6/1999 |
| JP | 06114240 | A | 4/1994 | JP | 11-179171 A | 7/1999 |
| JP | 06170364 | A | 6/1994 | JP | 11300177 A | 11/1999 |
| JP | 06190250 | A | 7/1994 | JP | 11302438 A | 11/1999 |
| JP | 06218237 | A | 8/1994 | JP | 11309351 A | 11/1999 |
| JP | 06238273 | A | 8/1994 | JP | 11319501 A | 11/1999 |
| JP | 06-292820 | A | 10/1994 | JP | 11319507 A | 11/1999 |
| JP | 06277469 | A | 10/1994 | JP | 11333265 A | 12/1999 |
| JP | 06285496 | A | 10/1994 | JP | 2000000439 A | 1/2000 |
| JP | 06343837 | A | 12/1994 | JP | 200051670 | 2/2000 |
| JP | 07000770 | A | 1/1995 | JP | 2000051669 A | 2/2000 |
| JP | 07024272 | A | 1/1995 | JP | 2000061466 A | 2/2000 |
| JP | 07047247 | A | 2/1995 | JP | 200079390 | 3/2000 |
| JP | 07068139 | A | 3/1995 | JP | 2000070684 A | 3/2000 |
| JP | 07136470 | A | 5/1995 | JP | 2000-093758 | 4/2000 |
| JP | 07136471 | A | 5/1995 | JP | 2000-157845 | 6/2000 |
| JP | 07155564 | A | 6/1995 | JP | 2000157850 A | 6/2000 |
| JP | 07155758 | A | 6/1995 | JP | 2000185220 A | 7/2000 |
| JP | 7-39921 | | 7/1995 | JP | 2000189958 A | 7/2000 |
| JP | 07178323 | A | 7/1995 | JP | 2000233020 | 8/2000 |
| JP | 07185268 | A | 7/1995 | JP | 2000237548 A | 9/2000 |
| JP | 07185270 | A | 7/1995 | JP | 2000300968 A | 10/2000 |
| JP | 07185271 | A | 7/1995 | JP | 2000317276 A | 11/2000 |
| JP | 07185272 | A | 7/1995 | JP | 2000-334276 | 12/2000 |
| JP | 07204635 | A | 8/1995 | JP | 2000342932 A | 12/2000 |
| JP | 07236819 | A | 9/1995 | JP | 2001009246 A | 1/2001 |
| JP | 07-256253 | | 10/1995 | JP | 2001070967 A | 3/2001 |
| JP | 07251043 | A | 10/1995 | JP | 2001079366 A | 3/2001 |
| JP | 07275665 | A | 10/1995 | JP | 2001079367 A | 3/2001 |
| JP | 07289860 | A | 11/1995 | JP | 2001104760 A | 4/2001 |
| JP | 07303895 | A | 11/1995 | JP | 2001120963 A | 5/2001 |
| JP | 07313973 | A | 12/1995 | JP | 2001-510396 T | 7/2001 |
| JP | 08010585 | A | 1/1996 | JP | 2001179059 A | 7/2001 |
| JP | 8039089 | | 2/1996 | JP | 2001179060 A | 7/2001 |
| JP | 08-197053 | A | 8/1996 | JP | 2001190937 A | 7/2001 |
| JP | 08323161 | A | 12/1996 | JP | 2001190938 A | 7/2001 |
| JP | 08332357 | A | 12/1996 | JP | 2001205055 A | 7/2001 |
| JP | 09000890 | A | 1/1997 | JP | 2001-269546 | 10/2001 |
| JP | 09038470 | A | 2/1997 | JP | 2002011472 A | 1/2002 |
| JP | 09-075689 | | 3/1997 | JP | 2002177746 A | 6/2002 |
| JP | 09072993 | A | 3/1997 | JP | 3302992 B2 | 7/2002 |
| JP | 09099227 | A | 4/1997 | JP | 2002-527229 A | 8/2002 |
| JP | 09103655 | A | 4/1997 | JP | 2002525197 T | 8/2002 |
| JP | 9103661 | A | 4/1997 | JP | 2002263407 A | 9/2002 |
| JP | 9117647 | A | 5/1997 | JP | 2002-336663 | 11/2002 |
| JP | 9138298 | | 5/1997 | JP | 2003024751 | 1/2003 |
| JP | 09141063 | A | 6/1997 | JP | 2003047830 A | 2/2003 |
| JP | 09155345 | A | 6/1997 | JP | 2003053157 A | 2/2003 |
| JP | 09187628 | A | 7/1997 | JP | 2003053160 A | 2/2003 |
| JP | 09192458 | A | 7/1997 | JP | 200371254 | 3/2003 |
| JP | 09220569 | A | 8/1997 | JP | 2003062436 A | 3/2003 |
| JP | 09271641 | A | 10/1997 | JP | 2003135935 A | 5/2003 |
| JP | 09-313902 | | 12/1997 | JP | 2003190976 A | 7/2003 |
| JP | 09324067 | A | 12/1997 | JP | 2003-265597 | 9/2003 |
| JP | 10-015365 | A | 1/1998 | JP | 2003-275548 A | 9/2003 |
| JP | 10024222 | A | 1/1998 | JP | 2003266072 A | 9/2003 |
| JP | 10033955 | A | 2/1998 | JP | 2003275759 A | 9/2003 |
| JP | 10048466 | A | 2/1998 | JP | 2003340250 A | 12/2003 |
| JP | 10076144 | A | 3/1998 | JP | 2004-008981 | 1/2004 |
| JP | 10076264 | A | 3/1998 | JP | 2004073950 A | 3/2004 |
| JP | 10085562 | A | 4/1998 | JP | 2004-230287 | 8/2004 |
| JP | 10085565 | A | 4/1998 | JP | 2004216263 A | 8/2004 |
| JP | 10085566 | A | 4/1998 | JP | 2004230280 A | 8/2004 |
| JP | 10156149 | A | 6/1998 | JP | 2004322100 A | 11/2004 |
| JP | 10180048 | A | 7/1998 | JP | 2004-536710 A | 12/2004 |
| JP | 10225685 | A | 8/1998 | JP | 2004337730 A | 12/2004 |
| JP | 10235168 | A | 9/1998 | JP | 2005-502467 A | 1/2005 |

| | | |
|---|---|---|
| JP | 2005-087887 A | 4/2005 |
| JP | 2005144291 A | 6/2005 |
| JP | 2005154551 A | 6/2005 |
| JP | 2005279447 A | 10/2005 |
| JP | 2006-116495 | 5/2006 |
| JP | 2007-547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 2005-063478 | 6/2005 |
| NL | 1006390 C2 | 12/1998 |
| NL | 1020491 | 10/2003 |
| NL | 1021197 | 10/2003 |
| NZ | 510394 A | 5/2003 |
| NZ | 537874 A | 2/2007 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 8801895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 99-55448 A1 | 11/1999 |
| WO | 9959707 A1 | 11/1999 |
| WO | 0018498 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0226363 A2 | 4/2002 |
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | WO 2005/028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

WPI Week 199922, Thomas Scientific, London, GB; AN 1999-258520, XP002521538.

"Chemical Cleaning Definition", Lenntech BV, Lenntech Water treatment & purification Holding B.V., Chemical Cleaning.

Webster's Ninth New Collegiate Dictionary, Merriam-Webster Inc., Publishers, Springfield, Massachusetts, USA, Copyright 1986, p. 1298.

Almulla et al., Desalination, 153 (2002), pp. 237-243.

Anonymous, "Nonwoven Constructions of Dyneon"THV and Dyneon "The Fluorothermoplastics", Research Disclosure Journal, Apr. 1999, RD 420013, 2 pages.

Cote et al., Wat. Sci. Tech. 38(4-5)(1998), pp. 437-442.

Cote, et al. "A New Immersed Membrane for Pretreatment to Reverse Osmosis" Desalination 139(2001) 229-236.

Craig, Jones, "Applications of Hydrogen Peroxide and Derivatives," The Royal Society of Chemistry, Cambridge, UK 1999 Chapters 2 and 5.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Delgrange-Vincent, N. et al., Desalination 131 (2000) 353-362.

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Japanese Office Action dated Aug. 17, 2010 for Application No. 2007-547083.

Johnson, "Recent Advances in Microfiltration for Drinking Water Treatment," AWWA Annual Conference, Jun. 20-24, 1999, Chicago, Illinois, entire publication.

Kaiya et al., "Water Purification Using Hollow Fiber Microfiltration Membranes," 6th World Filtration Congress, Nagoya, 1993, pp. 813-816.

Kang et al. "Characteristics of microfiltration membranes in a membrane coupled sequencing batch reactor system" Water Research, Elsevier, Amsterdam, NL, vol. 37, No. 5, Mar. 2003.

Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

Mark et al., "Peroxides and Peroxy Compounds, Inorganic" Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.

MicroCTM—Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.

Rosenberger et al., Desalination, 151 (2002), pp. 195-200.

U.S. Appl. No. 60/278,007, filed Mar. 23, 2001.

Ueda et al., "Effects of Aeration on Suction Pressure in a Submerged Membrane Bioreactor," Wat. Res. vol. 31, No. 3, 1997, pp. 489-494.

Water Encyclopedia, edited by Jay Lehr, published by John Wiley & Sons, Inc., Hoboken, New Jersey, 2005. Available at http://wwwm-mrw.interscience.wiley.com/eow/.

White et al., The Chemical Engineering Journal, 52 (1993), pp. 73-77.

Wikipedia, "Seawater," available at http://en.wikipedia.org/wiki/Seawater, Jul. 15, 2007.

Yamamoto et al., Water Science Technology, vol. 2, pp. 43-54; 1989.

Yoon: "Important operational parameters of membrane bioreactor-sludge disintegration (MBR-SD) system for zero excess sludge production" Water Research, Elsevier, Amsterdam, NL, vol. 37, No. 8, Apr. 2003.

Zenon, "Proposal for ZeeWeed® Membrane Filtration Equipment System for the City of Westminster, Colorado, Proposal No. 479-99," Mar. 2000, entire publication.

Cui et al., "Airlift crossflow membrane filtration—a feasibility study with dextran ultrafiltration," J. Membrane Sci. (1997) vol. 128, pp. 83-91.

European Search Report dated Oct. 20, 2011 for Application No. 11180826.7.

Coulson et al., "Coulson and Richardson's Chemical Engineering," 1999, vol. 1, pp. 358-364.

* cited by examiner

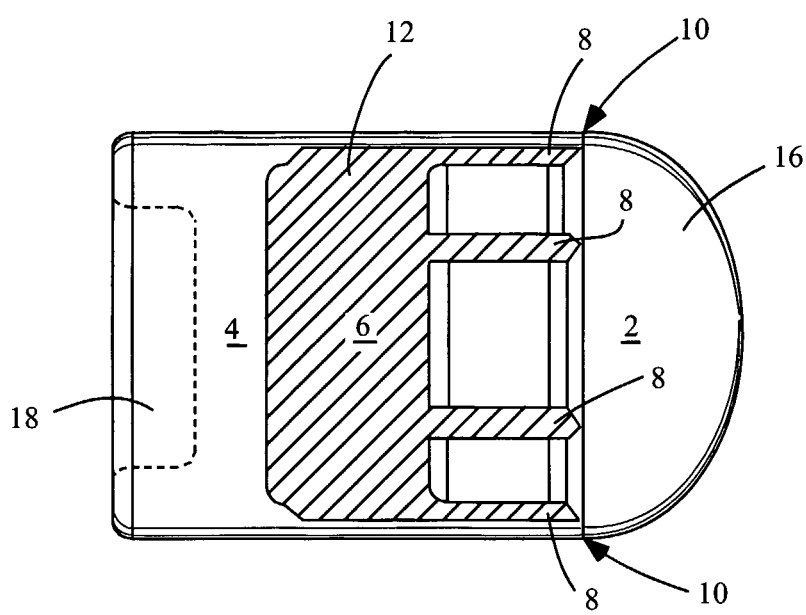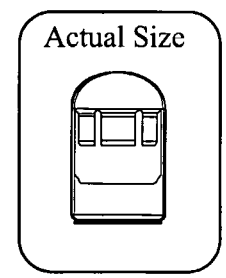
Fig. 1A                                  Fig. 1B

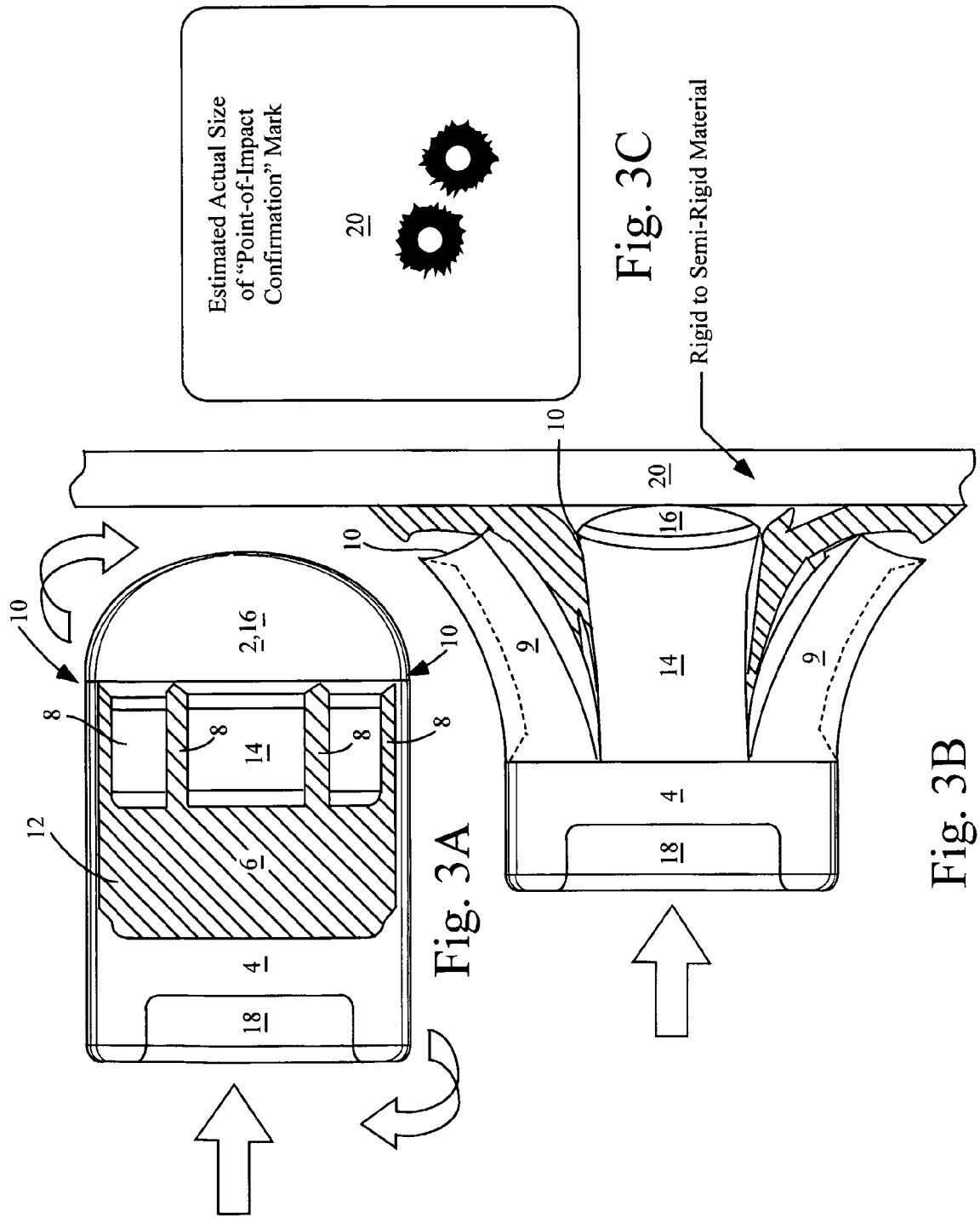

CLEANING IN MEMBRANE FILTRATION SYSTEMS

PRIORITY

This application claims the benefit of priority to U.S. patent application Ser. No. 10/846,883, filed May 14, 2004, by inventor Rick Huffman, entitled, Non-Lethal Marking Bullet for Related Training Cartridges, and this application claims priority to U.S. provisional patent application no. 60/539,022, filed Jan. 22, 2004 by inventor Rick Huffman. This application is related to United States patent application entitled "Reduced Energy Training Cartridge for Self-Loading Firearms", application Ser. No. 10/799,898, filed Mar. 12, 2004, also by inventor Rick Huffman, which is hereby incorporated by reference.

BACKGROUND

1. Field of the Invention

The invention relates to dedicated or modified non-lethal firearms equipment, and particularly to a non-immobilizing projectile that disperses marking material upon impact with a target.

2. Description of the Related Art

Various designs of non-lethal projectiles exist that are typically tailored to the specific application with which it is to be used. The terms "projectile" and "bullet" are generally used interchangeably herein, although as understood by those skilled in the art, a bullet may be housed within a cartridge in static condition before firing, and become a projectile when launched. A projectile is in a dynamic condition as referred to herein after firing when on its way through the air toward a target prior to impact. The projectile or bullet is in a static condition prior to firing such as when loaded into the chamber of a non-lethal modified or dedicated firearm, or when assembled prior to loading. Applications include paint ball, and in this context, it is desired to have a projectile that marks a human target on impact, but does not cause pain or immobilization. Generally, paint ball rounds are fired in a game setting. They effectively mark targets without causing even moderate pain or injury upon impact. They also have short ranges and inaccurate trajectories that pose highly reduced safety concerns compared with lethal ammunition.

In a paint ball application described at U.S. Pat. No. 5,965,839, which is hereby incorporated by reference, a delivery housing is described for providing trajectory stabilization and distance during delivery of the marking material-filled casing. This extra housing adds an undesirable layer of complexity and cost. It is desired to have a stable non-lethal projectile with adequate range that does not include such a delivery housing containing the marking material-filled casing when the projectile is in the dynamic condition.

The '839 patent and multiple other references describe projectiles including delivery housings that contain one or more casings that are filled with marking material. The casings are often exploded upon impact by a sharpened edge within the delivery housing. In addition to the '839 patent, another example of a projectile uses a sharpened edge or "striker" and is described at U.S. Pat. No. 6,250,226. The striker perforates a container of incapacitating agent upon impact of the projectile with a target. Multiple orifices are provided around a casing that delivers the container to the target along its trajectory for omni-directionally dispersing the incapacitating agent. Other projectiles that include striker components for breaking open a container of fluid under pressure are described at U.S. Pat. No. 6,209,461. These designs using sharpened edges typically have the marking material casing resting nearby raising an clear risk of premature puncture and release of marking material. It is desired to have a multi-function casing that both contains the marking material and provides a stable and aerodynamic delivery mechanism that also forward-disperses the marking material upon impact.

Like these games, some training applications and target practice generally require only that the projectiles mark a target upon impact. Whether or not they would be immobilizing or lethal in nature if they struck a human target may be unimportant, irrelevant, or even undesirable as raising unnecessary safety concerns. However, some non-immobilizing projectile designs have trajectories that may be drastically different than typically higher speed lethal projectiles, and this unsatisfactory. A training aid should allow the training to mimic real conditions as closely as possible while sufficiently subsiding the safety concern to participants' lives inherent in live-fire conditions. It is desired to have a non-lethal projectile that may maintain a stable trajectory similar to that of a non-training immobilizing and perhaps lethal projectile for training and target practice applications.

A very different approach in design for a non-lethal ammunition round is described at U.S. Pat. No. 5,652,407. The design includes multiple parallel and entirely cylindrical projectiles. The projectiles launch simultaneously and tumble through the air toward impact striking the target at various orientations. Marking materials may be impregnated within, coated on or carried by the projectiles. The spread of the strike locations and marked regions is random and broad, e.g., similar to the result of multiple impacts by shotgun shrapnel. Moreover, the trajectories may vary and are likely inaccurate and of short range. It is desired to have a more stable and long range trajectory, and a more concentrated impact and marking material dispersion zone upon impact.

A further application for non-lethal projectiles is riot control. It is typically desired that these projectiles either harm, but not kill, a target person upon impact, or release some form of immobilizing agent, such that either way, the person will be deterred from the further pursuit of rioting. Generally, the marking of targets on impact is not high priority for these applications.

In a baton round for riot control, U.S. Pat. No. 6,371,028 describes a projectile including a casing filled with multiple balls, e.g., steel ball bearings, that redistribute upon impact to soften their effect. The purpose is to deter further rioting without causing serious harm to the targeted person. There is no marking material or other agent within the projectile that disperses upon impact with the target.

U.S. Pat. No. 3,982,489 describes a ring airfoil projectile that is designed to be aerodynamic and to have a high spin rate in a dynamic condition. The ring airfoil design is provided to increase stability, flatten the trajectory and increase the range. Other ring airfoil projectiles are described at U.S. Pat. Nos. 4,270,293 and 4,262,597. The projectiles are ring-shaped, i.e., with hollowed centers. There is no marking material described as being associated with any of these projectiles.

Another non-marking projectile is described at U.S. Pat. No. 5,221,809. The projectile includes a woven bag that fills through a valve with some of the same pressurized propellant that ejects the projectile from a launching device. The bag inflates upon leaving the launcher, which slows the projectile and softens the impact. Another controlled-deformation projectile is described at U.S. Pat. No. 6,302,028 that spreads out at such a diameter that penetration is limited and energy is rapidly spread out by instantaneous enlargement.

Other examples of cartridges including non-lethal projectiles without marking materials, e.g., for training, animal control, or riot control purposes, are described at U.S. Pat. Nos. 6,415,718, 6,564,719, and 6,295,933. Also, U.S. Pat. No. 3,952,662 describes a projectile that may be fired from a conventional shotgun. The projectile may be loaded into a conventional shotgun casing. The projectile has "arms" that extend in dynamic condition to prevent the projectile from penetrating the target. The projectile is described as being filled with buckshot and weights.

At U.S. Pat. No. 5,791,327, a projectile is described as including a base member and point shaped component to form a chamber for holding a disabling agent such as pepper powder or other disabling gas or liquid. A hollow tip and cylindrical body form an inner cavity which is closed after the agent or other substance is inserted. The walls include fracture lines that are designed to break laterally and longitudinally upon impact for causing lateral distribution of the agent. Such fracture lines are formed within casings of projectiles also described at U.S. Pats. No. 6,393,992, 6,543,365 and 6,546,874.

Several conventional projectile designs for use with non-lethal firearms and cartridges provide liquid or gaseous expulsion upon impact or are themselves liquid or gaseous and propelled directly from the firearm device. For example, U.S. Pat. No. 5,983,548 describes a non-lethal firearm device for directly ejecting liquids or gases under pressure, but not solid projectiles. The device is described as being designed to propel a debilitating chemical substance such as pepper spray or mace. Another example of liquid or gaseous propulsion firearms is described at U.S. Pat. No. 6,658,779.

Various projectile designs exist that provide marking and immobilization upon impact. For example, U.S. Pat. Nos. 6,230,630 and 6,615,739 describe projectiles that include both marking and immobilizing agents. The projectiles include cylindrical and hemispherical components that are separated by a circular insert to isolate their interior volumes. An embodiment is described wherein, after joining these three components, the marking material is dispensed through a fill port to the interior volume of the hemispherical portion that is subsequently sealed. In another embodiment, marking material is contained within glass ampules that are placed within the interior compartment of the cylindrical component.

Among other examples of conventional technology are a projectile including a transmitter that is used in combination with a reader target as described at U.S. Pat. No. 6,604,946. Another projectile delivers an electrical shock upon impact with a target as described at U.S. Pat. No. 5,962,806. A non-lethal, one- or two-piece projectile is described at U.S. Pat. No. 6,374,741 for being fired from a grenade launcher. A variable lethality projectile is described at U.S. Pat. No. 6,553,913, and a further projectile, although not of non-lethal design, is described at U.S. Pat. No. 6,672,218. All of the patents described above are hereby incorporated by reference into this application for all purposes.

SUMMARY OF THE INVENTION

According to a first aspect of the invention, a projectile of non-lethal composition is provided including one or more components forming an outer casing that is substantially sealed prior to impact with a target both when the projectile is in a static condition and when the projectile is in a dynamic condition providing a concentrated impact zone with the target. A non-toxic marking material is encapsulated within the outer casing prior to impact. The outer casing is configured to deform and unseal upon impact such that the marking material disperses forward via hydraulic action providing a concentrated marking material zone around the impact zone. The casing serves both as an aerodynamic delivery housing and to contain the marking material when the projectile is in the dynamic condition.

The marking material may comprise a paste. When loaded into a cartridge, the projectile may maintain a substantially right cylindrical shape for more than half of its exposed length. The projectile may be configured such that upon impact, deformation produces an unsealing of the casing, and compaction of the casing into the marking material produces the hydraulic action and the forward dispersion. A majority of the outer casing may have a right cylindrical shape. The casing may have an at least in part substantially cylindrical shape.

According to another aspect, a projectile of non-lethal composition may include a cup component and a cap component. The cup component includes a heel portion and a hollowed well portion defining a well cavity. A non-toxic marking material is disposed within the well cavity. The cap component includes an exposed tip portion and a seat portion. The seat portion couples within the well cavity of the cup component and substantially seals the marking material therein prior to impact with a target both when the projectile is in a static condition and when the projectile is in a dynamic condition providing a concentrated impact zone with the target. The marking material marks the impact zone through dispersing the material forward via hydraulic action upon impact providing a concentrated marking material zone around the impact zone.

The one or more components of the first aspect, and/or a projectile in accordance with aspects that follow, may include the cup and cap components, and the projectile according to any of these may further include one or more of the following features. The cap or cup component, or both, may be configured to deform upon impact unsealing the marking material, and the hydraulic action may be produced due to compaction of the cap component into the marking material. The cup component may comprise a heel portion and a hollowed well portion defining a well cavity within which the marking material is disposed prior to impact. The cap component may comprise an exposed tip portion and a seat portion. The seat portion may couple within the well cavity substantially sealing the marking material therein. The heel and well portions of the cup component may have substantially right cylindrical shapes. The heel portion of the cup component may defines an inset cavity opposite the well cavity for coupling with a cartridge protrusion having a flash hole defined therein for communicating pressurized gas from the cartridge to propel the projectile. An outer peripheral interface between the tip and seat portions of the cap component may substantially match an outer periphery of the cup component providing the substantial sealing of the marking material within the well cavity prior to impact. Upon impact, deformation of the cap or cup components, or both, may unseal the marking material at the matching peripheries, and compaction of the cap component into the marking material produces said hydraulic action and forward dispersion. The marking material may be inserted into the well cavity prior to sealing the cup and cap components to form the projectile.

One or more fissures or serrations (hereinafter referred to as "fissures") may be defined between the cap and cup components when the projectile is sealed that facilitate the breaking of the projectile upon impact to release the marking material. The one or more fissures may be filled with the marking material. The one or more fissures may be defined between the seat portion of the cap component and an interior wall of the hollowed portion of the cup, such that the marking material fills a volumetric cavity and the one or more fissures between the cup and cap components when seated within the well cavity prior to impact. An interior surface of the casing that contains the marking material may include the one or more fissures.

In accordance with a further aspect, a projectile of non-lethal composition includes two or more components forming an outer casing that is statically and dynamically stable and substantially sealed prior to impact with a target both when the projectile is in a static condition and when the projectile is in a dynamic condition. A non-toxic marking material is encapsulated within the outer casing prior to impact and configured such that, upon impact, the outer casing deforms and unseals, and the marking material disperses forward via hydraulic action upon impact. The projectile may include any of the other features provided above or below herein.

According to another aspect, a projectile of non-lethal composition includes one or more components forming an in-part substantially cylindrical outer casing prior to impact with a target both when the projectile is in a static condition and when the projectile is in a dynamic condition providing a concentrated impact zone with the target. The casing may be configured such that when loaded into a cartridge, the projectile maintains a substantially right cylindrical shape for more than half of its exposed length. The casing serves as an aerodynamic delivery housing. The casing may define an inset cavity for coupling with a cartridge protrusion having a flash hole defined therein for communicating pressurized gas from the cartridge to propel the projectile. A majority of the outer casing may have a right cylindrical shape. Other features provided above and below herein may also be included.

A method of manufacturing a projectile of non-lethal composition is also provided. The method includes providing two or more components that fit together to form a projectile. The components are configured such that upon coupling, a well cavity is defined therein, as well as one or more fissures leading from the well cavity toward a sealing interface between at least two of the components. A marking material ois provided within the well cavity prior to coupling the components. The coupling of the components includes pressurizing the marking material to cause it to flow into the fissures.

BRIEF DESCRIPTION OF THE DRAWINGS

FIG. 1A schematically illustrates a side view through a cavity well outer wall of a multiple component projectile of non-lethal composition in accordance with a preferred embodiment.

FIG. 1B schematically illustrates a preferred actual size of the projectile of FIG. 1A.

FIG. 3A schematically illustrates the projectile of FIGS. 1A-1B in dynamic condition prior to impact in a view through a cavity well outer wall.

FIG. 3B schematically illustrates the projectile of FIG. 3A with outer casing unsealing and marking material dispersing forward upon impact of the projectile with a target.

FIG. 3C schematically illustrates an estimated actual size of a point-of-impact confirmation mark made on the target of FIG. 3B by marking material.

DETAILED DESCRIPTION OF THE PREFERRED EMBODIMENTS

Figure 2D:
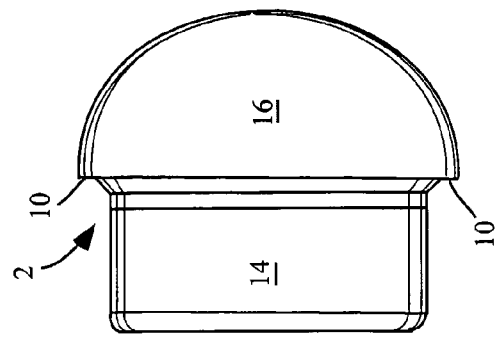
FIG. 2D schematically illustrates a cap component of the projectile of FIGS. 1A-1B.

FIG. 1A schematically illustrates a cross-sectional side view of a multiple component projectile of non-lethal composition in accordance with a preferred embodiment. FIG. 1B schematically illustrates a preferred actual size of the projectile of FIG. 1A. The projectile or bullet illustrated at FIGS. 1A and 1B can be produced to accommodate various cartridges (developed or pending development), including both mechanically operating cartridges, e.g., for 9 mm, .223, .308, etc., and non-mechanically operating cartridges, e.g., .38/.375 cal. revolver, 12 gauge shot shell, etc. In general, the bullet of the invention may be used with any of a wide variety of cartridges and cartridge conditions that work with related applications.

The projectile is formed from three main components: a cap component 2, a cup component 4, and a marking material component 6. The marking material 6 is shown cross-hatched in the drawings facilitating a clearer understanding of locations of the marking material under static, dynamic and impact conditions. The cap component 2 can have any of various shapes known in the art, and generally includes a seat component 14 and a tip component 16. The seat component inserts into a well cavity 12 defined within the cup component 4, while the tip component 16 remains exposed when the projectile is fully assembled. In a preferred embodiment, all or substantially all "air-voids" are omitted when the bullet's cup 4, cap 2, and marking material 6 are assembled, as illustrated at FIGS. 1A and 1B. This features provides a pre-balanced bullet, in the static condition, and improves the dynamic condition, when launched and in-flight, for ballistic stability.

Preferably the shape of the tip 16 is rounded as shown, which is generally more so than a conventional cone-shaped projectile. That is, the projectile of FIG. 1A, when loaded into a cartridge, maintains a substantially right cylindrical shape for more than half of its exposed length. The unexposed length preferably substantially matches the shape of the cavity of the cartridge component (e.g., piston sleeve, see FIG. 4) within which the projectile is to be inserted prior to discharge, and as shown is preferably substantially right cylindrical. The projectile or sleeve interior may include one or more fins. The shape of the tip 16 that is shown in FIG. 1A is preferred over a more cone-shaped or pointed design, because it is desired to have a projectile that is less likely to penetrate a target. This is because it is intended that animate objects such as persons may be targets, and in addition, the marking feature of the projectile will be less effective if the projectile penetrates the target that is intended for marking. The cone-shaped or more pointed design may, however, be alternatively used with various aspects of the invention. Preferred and alternative shapes may be further illustrated at the co-pending patent application by the same inventor, Rick Huffman, entitled, "Reduced Energy Training Cartridge for Self-Loading Firearms", filed Mar. 12, 2004, and which is hereby incorporated by reference, and further alternative shapes may be understood by those skilled in the art or as shown in references cited herein.

FIG. 1A also illustrates multiple fissures (or serrations) 8. The fissures 8 are preferably six in number and generally outside the seat component 14 material of the cap 2. These fissures are preferably internal allowing the outer wall of cup component 4 to remain smooth as to provide greater contact to barrel rifling as desired to create dynamic (bullet spin) stability. These fissures are preferably grooves that are formed in the inner surface of the cup component 4 that facilitate the breaking or splitting of the projectile upon impact with a target for releasing the marking material to mark the target. The fissures 8 may also include grooves formed in the outer periphery of the seat component 14 (see FIG. 2D) of the cap component 2. The fissures 8 may be formed in further alternative ways, as may be understood by those skilled in the art and/or as may be described in references cited herein, that may facilitate the splitting or breaking of the projectile upon impact. FIG. 1 indicates that the marking material 6 fills the fissures 8 due to the lack of cup component material within the fissures 8 and due to the preferred fluidic or quasi-fluidic nature of the marking material. The marking material 6 is preferably a somewhat thick water soluble paste and may be liquid soap or glycerin with tempora added for color. Pressure exerted on the marking material 6 by the seat 14 when the cap 2 is coupled to the cup 4 causes the marking material to flow into and fill or partially fill the fissures 8.

The cup component 4 couples sealably with the cap component 2. The pasty nature of the marking material 6 preferably facilitates the sealing of the cap 2 with the cup 4. The seal may also form suitably as a result of the close fitting diameters of the seat 14 and walls 9 of the well cavity 12, and/or the static frictional force between them when coupled due to the material characteristics and/or shapes. Under the proper conditions, the marking material may be more liquid and less pasty, and yet the sealing of the cap 2 and cup 4 may still be sufficient.

The cup component 4 includes walls 9 that lead all the way to the rim interface 10 of the cap component 2. The cup component 4 includes a well cavity 12 that is filled with the marking material 6. The cup component 4 also includes an inset cavity 18 opposite the well cavity 12 for coupling with a cartridge protrusion having a flash hole defined therein for communicating pressurized gas from the cartridge to propel the projectile (see the cartridge application, incorporated by reference above). The rim interface 10 provides an outer peripheral interface between the tip 16 and seat 14 of the cap component 2 that substantially matches an outer periphery of the walls 9 of the cup component 4 facilitating substantial sealing of the marking material 6 within the well cavity 12 prior to impact. The cap 2 and cup 4 preferably comprise polyethylene or a similar pliable plastic, rubber or other such material.

An alternative bullet or projectile, e.g., for use with inanimate target applications, may exclude the marker material. The projectile may be as described with the well cavity 12 simply remaining void throughout the coupling, launch and impact conditions, or filled with another material such as an immobilizing agent or a paste not having marking capacity. Alternatively, there may simply be no well cavity 12, and the bullet may be a solid single or multiple piece unit. Of course, the usefulness of the fissures 8 for facilitating the breaking of the bullet for releasing the marking material would not exist and so it is not desired to have them. However, if existing supplies of cup and cap components 2, 4 exist, although it may not be desired to mark a target in a particular application, bullets may be formed with cup and cap components 2, 4 as described herein with marking material left out.

Figure 2E:
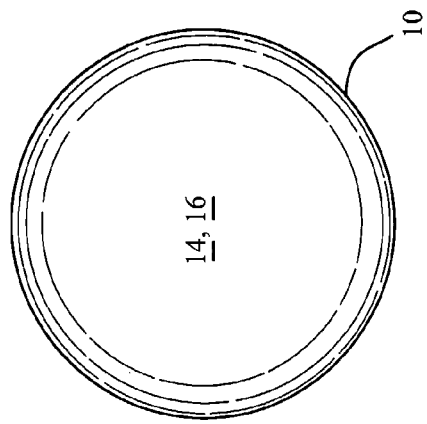
FIG. 2E schematically illustrates a tip end view of the projectile of FIGS. 1A-1B.
Figure 2C:
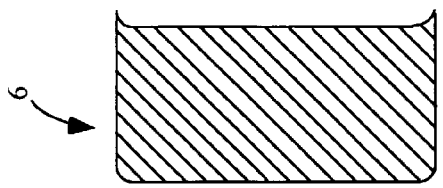
FIG. 2C schematically illustrates a marking material component of the projectile of FIGS. 1A-1B.
Figure 2A:
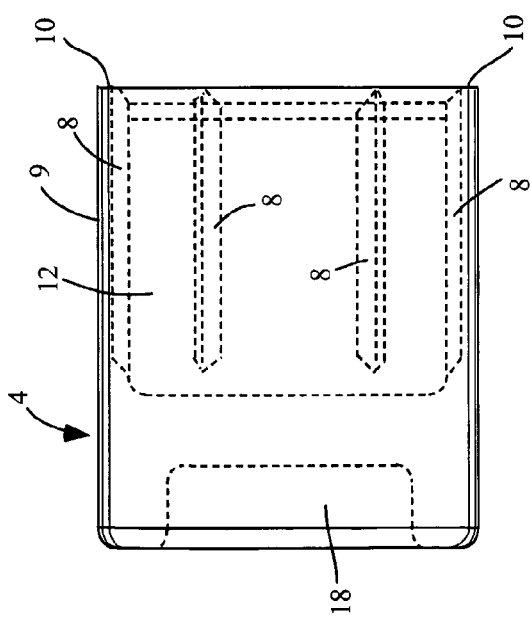
FIG. 2A schematically illustrates a cup component of the projectile of FIGS. 1A-1B.

FIG. 2A schematically illustrates a cup component 4 of the projectile or bullet of FIGS. 1A-1B. In addition to further illustrating the well cavity 12, the inset cavity 18, the rim interface 10 and the walls 9 of the cup component 4, the fissures 8 are illustrated in this view without being filled with the marking material. FIG. 2A illustrates that it is preferred that the fissures 8 comprise grooves that cut into the walls 9 of the cup component 4

Figure 2B:
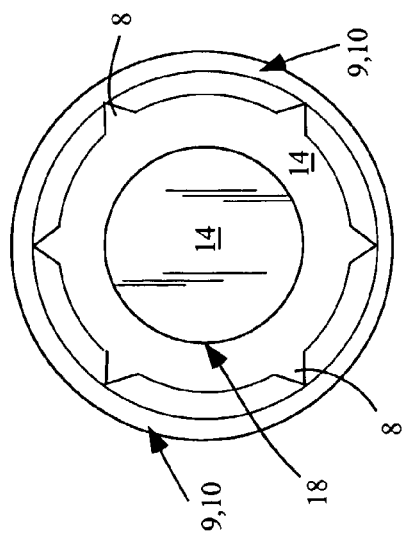
FIG. 2B schematically illustrates an heel end view of the cup component of FIG. 2A.

FIG. 2B schematically illustrates a heel end view of the cup component of the projectile of FIG. 2A. The boundary of the inset cavity 18 is illustrated. At the outer periphery in the heel end view of FIG. 2B, six fissures 8 are shown as is the cup component wall 9. At the very end of the wall 9 is the rim interface 10 of the cup 4 that meets a corresponding rim interface 10 of the cap 2. Fewer or more fissures 8 than six may be provided.

FIG. 2C schematically illustrates a marking material component 6 of the projectile of FIGS. 1A-1B. The marking material 6 is shown before it is pressurized by setting the cap component thereon and flowing to fill the fissures 8 of FIG. 2D.

FIG. 2D schematically illustrates a cap component 2 of the projectile of FIGS. 1A-1B including the seat portion 14, which directly contacts and pressurizes the marking material 6 upon coupling. The tip portion 16 and the rim interface 10 are also shown. The rim interface 10 of the cap component 2 seals with the corresponding rim interface 10 of the cup component 4 upon coupling.

FIG. 2E schematically illustrates a tip end view of the cap component 2 of the projectile of FIG. 2D. In this view, the fissures 8 and cup component wall 9 are illustrated. The inset cavity boundary 18 is not shown in this tip end view so that the extent of the seat component 14 of the cap 2 can be illustrated. The marking material 6 also preferably occupies the space directly below the seat 14, in addition to filling the fissures 8 shown in FIGS. 2A-2B.

FIG. 3A schematically illustrates the projectile of FIGS. 1A-1B in dynamic condition prior to impact in the cross-sectional side view of FIG. 1A. The arrows illustrate that the projectile is moving from left to right in the plane of FIG. 3A, and is rotating. FIG. 3B schematically illustrates the projectile of FIG. 3A at impact. The impact force drives the seat portion 14 of the cap 2 deeper into the well cavity 12. In the example of FIG. 3B, the seat portion 14 contacts the solid portion of the cup component 4 at the bottom of the well cavity 12. The outer wall 9 is shown unsealing from the cap 2 at the rim interface 10, and the marking material is shown dispersing forward to the target 20. FIG. 3C schematically illustrates an estimated preferred actual size of a point-of-impact confirmation mark made on the target 20 of FIG. 3B by marking material 6 of the projectile of FIG. 1B.

Figure 4:
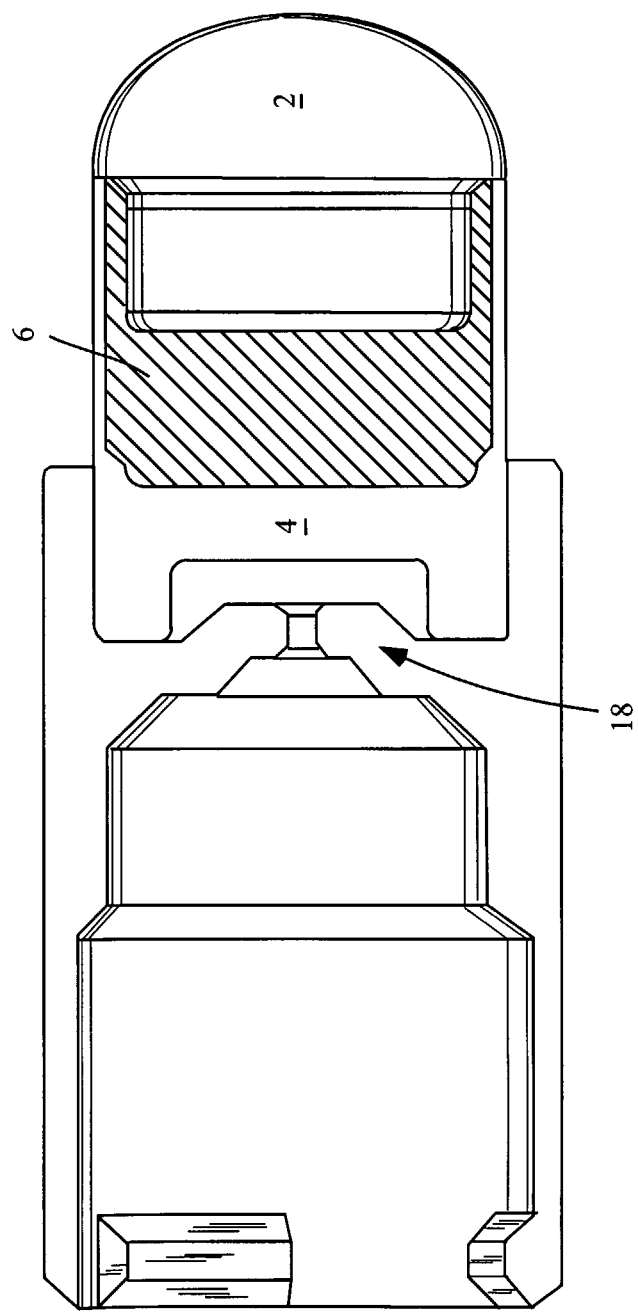
FIG. 4 schematically illustrates a cross-sectional side view of a piston sleeve of a cartridge within which the projectile of FIGS. 1A-3C is inserted revealing the inner structure in accordance with a preferred embodiment.

FIG. 4 schematically illustrates a cross-sectional side view of a piston sleeve of a cartridge within which the projectile of FIGS. 1A-3C may be inserted revealing the inner structure in accordance with a preferred embodiment. The piston sleeve is a component of a preferred two-piece cartridge from which the projectile of FIGS. 1A-3C is launched. The aforementioned cartridge application describes the preferred cartridge in detail. The following is a short summary of features.

A two piece, two-stage, rechargeable, reusable, reduced-energy mechanically operating cartridge is provided for propelling a bullet of non-lethal composition from a dedicated or modified (rendered non-lethal status) firearm. The cartridge unit is comprised of a primary case, a piston sleeve, a propellant unit, and a bullet choice of a solid light weight material for inanimate-target applications or a "marking" version for non-lethal live-target applications such as is preferred herein and as has been described in detail above. The piston sleeve includes a substantially non-deformable jacket defining a bullet housing cavity at a first longitudinal end for coupling the bullet of non-lethal composition therein. The other end couples with the primary case. The primary case also includes a substantially non-deformable jacket for being axially coupled with the piston sleeve. The primary case also defines a cavity for receiving and retaining the propellant unit, a self contained unit consisting of a pyrotechnic material, or for containing pressurized gas or other propellant material. Upon activation, or cartridge discharging, the piston sleeve and primary case "mechanically extend or telescope" (dynamic condition) out from a compressed position (static condition), and thrust the base of the primary case away from the piston sleeve. The piston sleeve and primary case, having not substantially deformed preceding the mechanical operation are manually detached, spent propellant unit removed then replaced with a fresh one (cartridge recharged), the bullet is replaced, and the cartridge is ready for reuse.

According to another aspect, a two-piece, two-stage, rechargeable, reusable, mechanically operating cartridge for propelling a bullet of non-lethal composition from a dedicated or modified (rendered non-lethal status) firearm is provided including a primary case, a piston sleeve, a propellant unit, and a bullet as described herein. The piston sleeve includes a jacket defining a bullet housing cavity, or "mouth" at a first longitudinal end for coupling the bullet therein. The second end of the sleeve, or "throat" couples with the primary case and includes one or more partially annular ridge portions, or "cogs". The primary case also includes a jacket for being axially coupled with the second end of the piston sleeve, and including one or more complementary cogs and/or channels to the cogs of the piston sleeve. The primary case also defines a cavity for coupling with a propellant unit of pyrotechnic compound or for containing pressurized gas or other propellant material. Upon axial coupling and at least partial compression, the primary case and piston sleeve become relatively rotationally movable (cogs traveling in channels) to angularly overlap their respective ridge portions. The angular overlap is present when the piston sleeve and primary case are set into a compressed position. Upon cartridge discharging, when the primary case and piston sleeve are thrust apart in the dynamic condition, the piston sleeve and primary case generally remain coupled within the chamber of the firearm's barrel, although in one aspect, the cogs may be shearable such as to allow separation to reduce energy.

The cogs of the piston sleeve preferably include two or three or more spaced apart cogs or cog portions. The piston sleeve may further include groove portions, or "channels" between the cogs for mating with the complementary cogs of the primary case. These channels may slidably couple with the complementary cogs, corresponding to cog travel within channels.

According to a further aspect, the firearm includes an annular step between the chamber and the barrel. Upon cartridge discharging shoulders of the piston sleeve remain in firm contact with the annular step within the barrel's chamber, while the primary case and sleeve are thrust away from the compressed, static position to a telescoped position. The shoulder of the piston sleeve contact the annular step of the firearm's chamber preventing the sleeve from advancing further within the barrel, such that the piston sleeve and primary case remain coupled within the chamber of the firearm.

An advantageous cartridge preferably includes the above-recited aspects in combination with other aspects. Ultimately upon cartridge discharging, the bullet is propelled down the barrel of the non-lethal status firearm due to propellant pressure releasing through a "regulator" hole that preferably has a selected size or open/close devise for regulating the velocity of the projectile. Moreover, the piston sleeve preferably defines a second cavity at an opposite longitudinal end, i.e., from the end that couples with the primary case, for fitting the bullet therein. The bullet may be configured such that more than half of the length of the bullet which is exposed outside the mouth of the piston sleeve when loaded includes a substantially right cylindrical shape. The mouth of the piston sleeve and the bullet may couple in part due to pressure fittings protruding inwardly from the sleeve, or outwardly from the projectile, or both. The propellant unit cavity and propellant unit may couple in part due to pressure fitting protruding inwardly from the primary case, or outwardly from propellant unit, or both.

A method of preparing a two-piece, two stage, rechargeable, reusable, mechanically operating cartridge including a piston sleeve, a primary case, a propellant unit, and bullet is also provided. A bullet of non-lethal composition is loaded into the mouth defined within the piston sleeve. A propellant unit is loaded into a cavity defined within the primary case or a propellant mechanism is coupled with the cavity. The piston sleeve is axially coupled with the primary case including an initial relative axial displacement of the sleeve and base to bring them together. Cog portions, or partial annular protrusions, of the piston sleeve are coupled with annular channels of the primary base during the initial axial displacement. The piston sleeve and primary case are relatively rotationally displaced after the initial axial displacement such as to prevent direct axial separation. Partially annular channels extend to angularly overlap cogs portions of each of the base and sleeve such that cog portions of the piston sleeve and primary case are angularly overlapped after the relative rotational displacement.

In accordance with another aspect, a method is provided for preparing a two-piece, two stage, rechargeable, reusable, mechanically operating cartridge including a piston sleeve, primary case, propellant unit, and bullet. The bullet of non-lethal composition is loaded into the mouth defined within the piston sleeve. A propellant unit is loaded into a cavity defined within the primary case or another propellant mechanism is coupled with the cavity. The primary base and the piston sleeve are coupled together to form a reduced energy mechanically operating cartridge. The primary base and piston sleeve may be decoupled after cartridge discharging and ejection from the chamber of the firearm. The bullet loading and propellant unit charging or other propellant mechanism coupling, respectively, may be repeated with another bullet configuration and another propellant unit or other propellant mechanism. The coupling may be repeated for reuse of the piston sleeve and primary case in a same cartridge together or in different cartridges.

The methods preferably include reloading another bullet into the mouth defined within the piston sleeve for reuse, and/or recharging with another propellant unit into the cavity defined within the primary case or coupling with further propellant mechanism for reuse. The method preferably includes repeating the bullet loading of the piston sleeve then recharging the primary cartridge with a propellant unit or coupling with another propellant mechanism, and repeating the coupling and rotating steps for reuse of the primary case and piston sleeve in a same mechanically operating cartridge together or in different cartridges. The piston sleeve and primary case of the two-piece cartridge of the reuse step may be reused, respectively, with a different reusable primary base and/or a different reusable piston sleeve.

The methods described preferably further include chambering the mechanically operating cartridge into the dedicated or modified firearm (rendered non-lethal status). The cartridge prior to mechanical activation is considered to be in stage one (static condition). Upon activation, or cartridge discharge, the primary case and piston sleeve preferably "mechanically extend or telescope" considered the second stage (dynamic condition). Ultimately in the second stage, the bullet is propelled down the barrel of the dedicated or modified (non-lethal status) firearm due to propellant pressure releasing through a flash hole regulator that mandates a selected size for regulating the velocity of the projectile. The primary case and the piston sleeve may be configured to be relatively rotationally movable to angularly overlap respective ridge portions. The angular overlap may be present when the piston sleeve and primary case are set into a compressed position (static condition), such that upon cartridge discharging, when the piston sleeve and primary case mechanically extend, the piston sleeve and primary case remain coupled within the chamber of the firearm. As a safety concern piston sleeve cogs are designed to "shear off" if propellant unit or propellant form is manipulated creating "overcharging" of propellant, as such cogs will shear off causing cartridge to separate entirely expelling excessive propellant thus preventing unsafe projectile velocity The firearm may include an annular step between the chamber and the barrel, such that upon firing when shoulder of the piston sleeve are firmly contacting the annular step, the primary case and piston sleeve are telescoped out from a compressed, static position to a telescoped position. The piston sleeve remains in contact with the annular step of the firearm preventing the sleeve from advancing further within the chamber of the barrel. The method may include coupling an annular O-ring protrusion, in addition to the coupling of the cogs and channels, within the throat of the piston sleeve coupled with the primary case stabilize the coupling of the charged mechanically operating cartridge when the two-piece cartridge is in a static position.

While an exemplary drawing and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention which is set forth in the claims that follow and includes structural and functional equivalents thereof.

For example, in addition to that which is described as background, the entire descriptions contained in the references cited in the background, the brief description of the drawings, the abstract and the invention summary, U.S. Pat. Nos. 4,899,660, 5,016,536, 5,121,692, 5,219,316, 5,359,937, 5,492,063, 5,974,942, 5,520,019, 5,740,626, 5,983,773, 5,974,942, 6,276,252, 6,357,331, 6,442,882, 6,625,916, 5,791,327, 6,393,992, 6,374,741, 5,962,806, 6,672,218, 6,553,913, 6,564,719, 6,250,226, 5,983,548, 5,221,809, 4,270,293, 6,615,739, 6,230,630, 6,543,365, 6,546,874, 5,965,839, 6,302,028, 6,295,933, 6,209,461, 5,962,806, 3,952,662, 6,658,779, 6,604,946, 6,553,913, 6,415,718, 5,652,407, 5,221,809, 4,270,293, 4,262,597, 3,982,489 and 5,983,773, are hereby incorporated by reference into the detailed description of the preferred embodiments, as disclosing alternative embodiments of elements or features of the preferred embodiments not otherwise set forth in detail. A single one or a combination of two or more of these references may be consulted to obtain a variation of the preferred embodiments described in the detailed description.

In addition, in methods that may be performed according to the claims and/or preferred embodiments herein and that may have been described above and/or recited below, the operations have been described and set forth in selected typographical sequences. However, the sequences have been selected and so ordered for typographical convenience and are not intended to imply any particular order for performing the operations unless expressly set forth in the claims or understood by those skilled in the art as being necessary.

The invention claimed is:

1. A method of cleaning a permeable, hollow membrane, the permeable, hollow membrane comprising a wall, a filtrate side, and an outer side, the method comprising:
    removing liquid from the filtrate side of the membrane;
    removing liquid from the outer side of the membrane;
    applying a chemical cleaning solution to the outer side of the membrane;
    creating a pressure differential across the membrane wall to flow the chemical cleaning solution through the membrane wall from the outer side of the membrane into the filtrate side to at least partially fill the filtrate side with the chemical cleaning solution;
    isolating the outer side of the membrane;
    applying a pressurized gas to the filtrate side to flow the chemical cleaning solution back to the outer side through the membrane wall;
    accumulating an increased pressure developed on the outer side of the membrane as a result of the flow of the chemical cleaning solution; and
    venting the pressurized gas applied from the filtrate side of the membrane to atmosphere to flow the chemical cleaning solution through the membrane wall from the outer side to the filtrate side under the effect of the accumulated pressure on the outer side of the membrane.

2. The method according to claim 1, wherein applying the pressurized gas to the filtrate side comprises substantially draining the filtrate side of the chemical cleaning solution.

3. The method of claim 1, wherein accumulating the increased pressure comprises accumulating the increased pressure in a gas space provided on the outer side of the membrane.

4. The method of claim 1, wherein accumulating the increased pressure comprises accumulating the increased pressure in a bladder arrangement.

5. The method of claim 1, wherein creating the pressure differential comprises applying gas pressure to the outer side of the membrane.

6. The method of claim 1, wherein creating the pressure differential comprises applying a vacuum to the filtrate side.

7. The method of claim 1, wherein the chemical cleaning solution comprises an oxidizing solution.

8. The method of claim 7, wherein the chemical cleaning solution comprises chlorine.

9. A method of cleaning a permeable, hollow membrane, the permeable, hollow membrane comprising a wall, a one side, and an other side, the method comprising:
    applying a chemical cleaning solution comprising at least one of an acid, a caustic solution, and an oxidizing solution to the one side of the membrane;
    creating a pressure differential across the membrane wall to flow the chemical cleaning solution though the membrane wall from the one side of the membrane to the other side of the membrane;

creating a reverse pressure differential across the membrane wall to flow the chemical cleaning solution through the membrane wall from the other side of the membrane back to the one side of the membrane;

accumulating an increased pressure developed on the one side of the membrane as a result of the flow of the chemical cleaning solution through the membrane wall from the other side of the membrane back to the one side of the membrane; and venting the other side of the membrane to atmosphere from the other side of the membrane to flow the chemical cleaning solution through the membrane wall from the one side of the membrane back to the other side of the membrane under the effect of the accumulated pressure on the one side of the membrane.

10. The method of claim 9, wherein creating the pressure differential comprises applying gas pressure to the one side of the membrane.

11. The method of claim 9, wherein creating the pressure differential comprises applying a vacuum to the other side of the membrane.

12. The method of claim 9, wherein creating the reverse pressure differential comprises applying gas pressure to the other side of the membrane.

13. The method of claim 9, wherein creating the reverse pressure differential comprises applying a vacuum to the one side of the membrane.

14. The method of claim 9, wherein the chemical cleaning solution comprises citric acid.

15. The method of claim 9, wherein the chemical cleaning solution comprises chlorine.

16. A method of cleaning a permeable, hollow membrane, the permeable, hollow membrane comprising a wall, a filtrate side, and an outer side, the method comprising:

removing liquid from the filtrate side of the membrane;
removing liquid from the outer side of the membrane;
applying a chemical cleaning solution comprising at least one of an acid, a caustic solution, and an oxidizing solution to the outer side of the membrane;

creating a pressure differential across the membrane wall to flow the chemical cleaning solution though the wall from the outer side of the membrane into the filtrate side of the membrane to at least partially fill the filtrate side with the chemical cleaning solution;

creating a reverse pressure differential across the membrane wall to flow the chemical cleaning solution through the wall from the filtrate side of the membrane back to the outer side of the membrane;

accumulating an increased pressure developed on the outer side of the membrane as a result of the flow of the chemical cleaning solution through the membrane wall from the filtrate side of the membrane back to the outer side of the membrane; and venting the filtrate side of the membrane to atmosphere from the filtrate side of the membrane to flow the chemical cleaning solution through the membrane wall from the outer side back to the filtrate side under the effect of the accumulated pressure on the outer side of the membrane.

17. The method of claim 16, wherein creating the reverse pressure differential comprises applying a pressurized gas to the filtrate side of the membrane.

18. The method of claim 16, wherein the steps of the cleaning method are repeated in cycles such that the chemical cleaning solution is alternately moved from a first side of the membrane to a second side of the membrane through the membrane wall.

19. The method of claim 16, wherein the chemical cleaning solution comprises citric acid.

20. The method of claim 16, wherein the chemical cleaning solution comprises chlorine.

* * * * *

UNITED STATES PATENT AND TRADEMARK OFFICE
CERTIFICATE OF CORRECTION

| | | |
|---|---|---|
| PATENT NO. | : 8,496,828 B2 | Page 1 of 1 |
| APPLICATION NO. | : 11/722411 | |
| DATED | : July 30, 2013 | |
| INVENTOR(S) | : Johnson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Twelfth Day of May, 2015

Michelle K. Lee
*Director of the United States Patent and Trademark Office*